(12) United States Patent
Kyre

(10) Patent No.: US 10,853,566 B2
(45) Date of Patent: Dec. 1, 2020

(54) SYSTEMS AND METHODS FOR AUTOMATICALLY CREATING TABLES USING AUTO-GENERATED TEMPLATES

(71) Applicant: Datawatch Corporation, Bedford, MA (US)

(72) Inventor: Mark Stephen Kyre, Winston-Salem, NC (US)

(73) Assignee: DATAWATCH CORPORATION, Bedford, MA (US)

( * ) Notice: Subject to any disclaimer, the term of this patent is extended or adjusted under 35 U.S.C. 154(b) by 61 days.

(21) Appl. No.: 16/151,025

(22) Filed: Oct. 3, 2018

(65) Prior Publication Data

US 2019/0034399 A1  Jan. 31, 2019

Related U.S. Application Data

(63) Continuation of application No. 14/755,815, filed on Jun. 30, 2015, now Pat. No. 10,180,932.

(51) Int. Cl.

| | | |
|---|---|---|
| *G06F 17/20* | (2006.01) | |
| *G06F 40/177* | (2020.01) | |
| *G06F 40/186* | (2020.01) | |
| *G06F 40/205* | (2020.01) | |

(52) U.S. Cl.
CPC .......... *G06F 40/177* (2020.01); *G06F 40/186* (2020.01); *G06F 40/205* (2020.01)

(58) Field of Classification Search
None
See application file for complete search history.

(56) References Cited

U.S. PATENT DOCUMENTS

| | | | | |
|---|---|---|---|---|
| 5,018,077 A | * | 5/1991 | Healey | G06F 40/177 |
| | | | | 715/209 |
| 7,149,347 B1 | | 12/2006 | Wnek | |
| 7,606,816 B2 | * | 10/2009 | Kulkarni | G06F 40/131 |

(Continued)

FOREIGN PATENT DOCUMENTS

WO    WO-2017/004137 A1    1/2017

OTHER PUBLICATIONS

Ashish et al., Semi-Automatic Wrapper Generation for Internet Information Sources (Year: 1997).*

(Continued)

*Primary Examiner* — Shahid K Khan
(74) *Attorney, Agent, or Firm* — Fish & Richardson P.C.

(57) ABSTRACT

Systems and methods are provided for creating tables using auto-generated templates. Reports including lines of text to be extracted into tables are received. An auto define input is received to auto-generate the tables corresponding to the reports. Groups of lines are identified from among the lines of text in the reports. A detail group and relevant groups are selected and identified from among the groups of lines. A final detail group is created by merging the detail group with at least a portion of the relevant groups. Append groups are identified from among the groups of lines not included in the final detail group. Templates corresponding to the final detail group and the append groups are generated. Text is extracted from the reports based on the templates. Tables are generated using the text extracted from the reports, by assigning the text from the text fragments to entries in the tables.

27 Claims, 8 Drawing Sheets

(56) References Cited

U.S. PATENT DOCUMENTS

| | | | |
|---|---|---|---|
| 7,934,151 B1* | 4/2011 | Castrucci | G06F 40/177 715/222 |
| 2005/0022115 A1* | 1/2005 | Baumgartner | G06F 16/9535 715/205 |
| 2006/0288268 A1* | 12/2006 | Srinivasan | G06F 16/86 715/210 |
| 2007/0053611 A1* | 3/2007 | Wnek | G06K 9/00469 382/294 |
| 2008/0184102 A1* | 7/2008 | Selig | G06F 40/174 715/234 |
| 2008/0228908 A1 | 9/2008 | Link et al. | |
| 2011/0282877 A1 | 11/2011 | Gazen et al. | |
| 2012/0047100 A1* | 2/2012 | Lehner | G06F 40/103 706/46 |
| 2014/0369602 A1* | 12/2014 | Meier | G06K 9/00463 382/182 |
| 2015/0082154 A1 | 3/2015 | Walker | |
| 2016/0055376 A1* | 2/2016 | Koduru | G06K 9/00449 382/176 |
| 2019/0057148 A1* | 2/2019 | Wan | G06F 40/279 |

OTHER PUBLICATIONS

Hori et al., Robust Table Form Structure Analysis Based on Box Driven Reasoning (Year: 1995).*
Kieninger, Table Structure Recognition based on Robust Block Segmentation (Year: 1998).*
International Search Report, PCT16/39989, 2 pages, dated Sep. 30, 2016.
Written Opinion, PCT/US16/39989, 6 pages, dated Sep. 30, 2016.

* cited by examiner

FIG. 2

SYSTEMS AND METHODS FOR AUTOMATICALLY CREATING TABLES USING AUTO-GENERATED TEMPLATES

TECHNICAL FIELD

The present invention relates generally to generating tables from report files, and more particularly to systems and methods for automatically creating tables using auto-generated templates.

BACKGROUND

The digital world has given rise to the rapid growth and expansion of data that is generated, stored, analyzed, and used by a variety of entities including companies, organizations, universities, and individuals. Data is continuously being generated by millions of users and their devices, such as mobile devices, computers, wearable devices, point of sale terminals, navigation devices, and a multitude of sensors stored thereon.

One type of data that is frequently generated is report data, which is in turn commonly stored in text files such as report files. Report data in text files is typically unstructured or semi-structured, meaning that the text files do not have a pre-defined data model to which the data must adhere when it is imported into the report. In other words, report data is simply inserted into text files without being organized or understood by the system.

Report data and/or report files are used (e.g., generated and stored) in a number of industries including government, healthcare, retail, manufacturing, financial services, telecom, and the like. For instance, reports are used to track financial transactions, call records, invoices, balance sheets, customer lists, logs, health records, inventory, and locations, to name a few examples.

Report data in text files is difficult to access because it is arranged in a non-tabular format, which does not enable it to be easily selected, sorted, modified, charted, and the like. One common theme among entities and individuals generating and using reports is the desire to make report data more easily accessible, for example, so that it can be visualized, cleaned, filtered, combined, masked, and consolidated. This, in turn, makes report data easier and quicker to consume, less prone to errors, and more reliable.

To this end, systems exist which allow report data to be defined and exported into tables, spreadsheets, and the like. This provides the report data with a structure, therefore making it more accessible (e.g., for optical character recognition, visualization), manageable, and easier to store. For example, using traditional systems, data can be read from a text report file, and field extraction strategies can be applied to the data to produce a corresponding table of values. This is achieved by allowing users to manually define templates that identify text values that are expected to occur at specific character offsets in lines of a report and, in turn, have data extracted when data matching the manually defined templates is located.

More specifically, in traditional systems, a text report is loaded for review. Fields in the text report are not defined. In turn, each different type of line (e.g., lines with different properties) needs to be identified in order to create a corresponding trap mask. To create a trap mask, each field in a line must be manually selected (e.g., highlighted) and defined (e.g., labeled (e.g., as customer field, address field, etc.)). Moreover, to associate report data with corresponding headers (e.g., row labels) from row label lines, a user again has to create a trap mask by manually highlighting each field in such lines. If a user wants to add columns from other parts of the report to a certain line or group of lines in a table, the user again has to manually identify how and what information to append to the table.

This process is inefficient and unreliable because it requires each different type of line in a report to be manually identified and defined by the user. For example, if two lines contain the same types of data in columns arranged differently from one another, those two lines must be independently defined with separate templates and/or trap masks. Because templates and trap masks are not commonly understood, it is not always possible for users to generate tables from report data in text files.

There is a need, therefore, for systems and methods that allow for text files containing report data to be exported into tables, spreadsheets, and the like. There is also a need for systems and methods that identify report data in text files and automatically generate templates that are used to extract the data into tabular format. Moreover, there is a need for such systems and methods to be executed with minimal user interaction.

SUMMARY

The example embodiments and implementations presented herein meet the above-identified needs by providing systems and methods for automatically creating tables using auto-generated templates.

In some implementations, a method is used for creating tables using auto-generated templates. One or more reports are received (e.g., from memory, over a network), by a processor of a computing device. The one or more reports include lines of text to be extracted into one or more tables, and each of the lines of text includes text. An auto-define input to define templates is received by the processor (e.g., from a user of the computing device (e.g., via a click, tap)) for auto-generating (e.g., automatically create) the template trapping rules and field extraction directives to generate one or more tables corresponding to the one or more reports. In response to the receiving of the auto define input, a plurality of groups of lines are identified by the processor from among the lines of text in the one or more reports. The groups of lines form the basis for extracting the text from the one or more reports. A detail group is selected by the processor from among the groups of lines. One or more relevant groups are identified by the processor from among the groups of lines. The one or more relevant groups include lines of text made up of text fragments having one or more matching properties with the text fragments making up the lines of text in the detail group. A final detail group is created by the processor by merging the detail group with at least a portion of the one or more relevant groups. One or more append groups are identified from among the groups of lines not included in the final detail group. One or more templates corresponding to the final detail group and the one or more append groups are generated by the processor. The text is extracted from the one or more reports based on the one or more templates. Each of the one or more templates (e.g., trap mask and extraction directives) is used for identifying and extracting the text. One or more tables are generated (e.g., created, stored, displayed, output) using the text extracted from the one or more reports based on the one or more templates. Generating the one or more tables includes assigning (e.g., writing, appending, linking, mapping, tagging) the text from the text fragments to corresponding lines and fields (e.g., row and column locations) in the one or more tables.

In some implementations, identifying the groups of lines from among the lines of text includes: parsing, by the processor, each of the lines of text into the text fragments, each of the text fragments including the properties; scanning, by the processor, the lines of text to identify matching patterns (e.g., matching properties, matching text) between at least two of the lines of text, based on the properties and the text of the text fragments; and grouping, by the processor, lines of text having matching patterns.

In some implementations, lines of text in one of the groups of lines include one or more matching patterns selected from the group consisting of: (i) matching text in one or more of the text fragments in the lines of text of the one of the groups of lines; (ii) matching properties of one or more of the text fragments in the lines of text of the one of the groups of lines; and (iii) matching number of text fragments in the lines of text of the one of the groups of lines.

In some implementations, the matching properties of the one or more text fragments include one or more of a location, length, data type and alignment.

In some implementations, each of the lines of text in the one of the groups of lines include a matching (e.g., equal) number of text fragment. The text fragments in each of the lines of text in the one of the groups of lines include matching data types and alignment properties.

In some implementations, the text fragments are selected from the group consisting of values and labels.

In some implementations, labels include text values followed by a colon character or text values in a label row (e.g., column header).

In some implementations, the groups of lines are classified into classes.

In some implementations, the classes of the groups of lines include labeled data (e.g., label/value pairs), row labels (e.g., collection of substantially similar or identical lines representing column headers of a tabular region of a report), row data (e.g., data values from a tabular region of a report), and separators.

In some implementations, the detail group is one of the groups of lines having the largest number of lines of text.

In some implementations, identifying the one or more relevant groups includes: selecting, by the processor, a representative line of text from among the lines of text in the detail group; generating, by the processor, a category mask corresponding to the representative line of text; generating, by the processor, a category mask corresponding to each of the lines of text in the groups of lines; and determining, by the processor, if the category mask corresponding to each of the lines of text has matching patterns with the category mask corresponding to the representative line of text.

In some implementations, each of the one or more templates includes one or more of a trap mask and extraction directives.

In some implementations, the trap mask includes one or more indications of expected character properties (e.g., uppercase or lowercase, specific letter or sets letters, letter or number) at given character positions (e.g., offset, $5^{th}$ character position) on a line of text. The extraction directives include one or more rules for extracting the text from a line of text into the one or more tables, each of the one or more rules including one or more pairs of character offsets and number of characters to extract.

In some implementations, one of the one or more templates including the trap mask corresponds to a group of lines. The trap mask is generated by: generating, by the processor, a category mask for each character on the lines of text in the group of lines; generating, by the processor, a line mask for each of the lines of text in the group of lines, based at least in part on the category mask; generating, by the processor, a cumulative mask corresponding to the group of lines; creating, by the processor, table fields using field boundaries identified based at least in part on the cumulative mask; and generating the trap mask based on the identified field boundaries.

In some implementations, each of the one or more tables includes one or more rows and one or more columns. Generating the one or more tables includes arranging the text from the report into a row and column format in which: (i) each row or column includes labeled data, row labels or row data, and (ii) each location on the table (e.g., row and column pair address) includes one of the text fragments.

In some implementations, a system is provided for creating tables using auto-generated templates, comprising at least one memory, and a processor communicatively coupled to the at least one memory. The processor is operable to: receive (e.g., from memory, over a network) one or more reports, the one or more reports including lines of text to be extracted into one or more tables, and each of the lines of text including text; receive an auto-define input (e.g., from a user of the computing device (e.g., via a click, tap)) for auto-generating the one or more tables corresponding to content of the one or more reports; in response to the receipt of the auto define input: identify a plurality of groups of lines from among the lines of text in the one or more reports, the groups of lines forming the basis for extracting the text from the one or more reports; select a detail group from among the groups of lines; identify one or more relevant groups from among the groups of lines, the one or more relevant groups including lines of text made up of text fragments having one or more matching properties with the text fragments making up the lines of text in the detail group; create a final detail group by merging the detail group with at least a portion of the one or more relevant groups; identify one or more append groups from among the groups of lines not included in the final detail group; generate one or more templates corresponding to the final detail group and the one or more append groups; extract text from the one or more reports based on the one or more templates, each of the one or more templates (e.g., trap mask and extraction directives) being used for identifying and extracting the text; and generate (e.g., create, store, display, output) one or more tables using the text extracted from the one or more reports based on the one or more templates. Generation of the one or more tables includes assigning (e.g., writing, appending, linking, mapping, tagging) the text from the text fragments to corresponding lines and fields (e.g., row and column locations) in the one or more tables.

BRIEF DESCRIPTION OF THE DRAWINGS

The foregoing and other objects, aspects, features, and advantages of the present disclosure will become more apparent and better understood by referring to the following description taken in conjunction with the accompanying drawings.

FIG. 2 illustrates a graphical user interface for generating tabular data, according to an exemplary embodiment.

DETAILED DESCRIPTION

It should be understood that systems, devices, methods, and processes of the claimed invention encompass variations and adaptations developed using information from the embodiments described herein. Adaptation and/or modification of the systems, devices, methods, and processes described herein may be performed by those of ordinary skill in the relevant art.

Throughout the description, where articles, devices, and systems are described as having, including, or comprising specific components, or where processes and methods are described as having, including, or comprising specific steps, it should be understood that, additionally, there are articles, devices, and systems of the present invention that consist essentially of, or consist of, the recited components, and that there are processes and methods according to the present invention that consist essentially of, or consist of, the recited processing steps.

It should be understood that the order of steps or order for performing actions is immaterial so long as the invention remains operable. Moreover, two or more steps or actions may be conducted simultaneously.

The mention herein of any publication or patent application, for example, in the Background section, is not an admission that such publication or patent application constitutes prior art with respect to any of the claims or subject matter presented herein. The Background section is presented for purposes of clarity and is not intended to be a description of prior art with respect to any claim.

Figure 1:
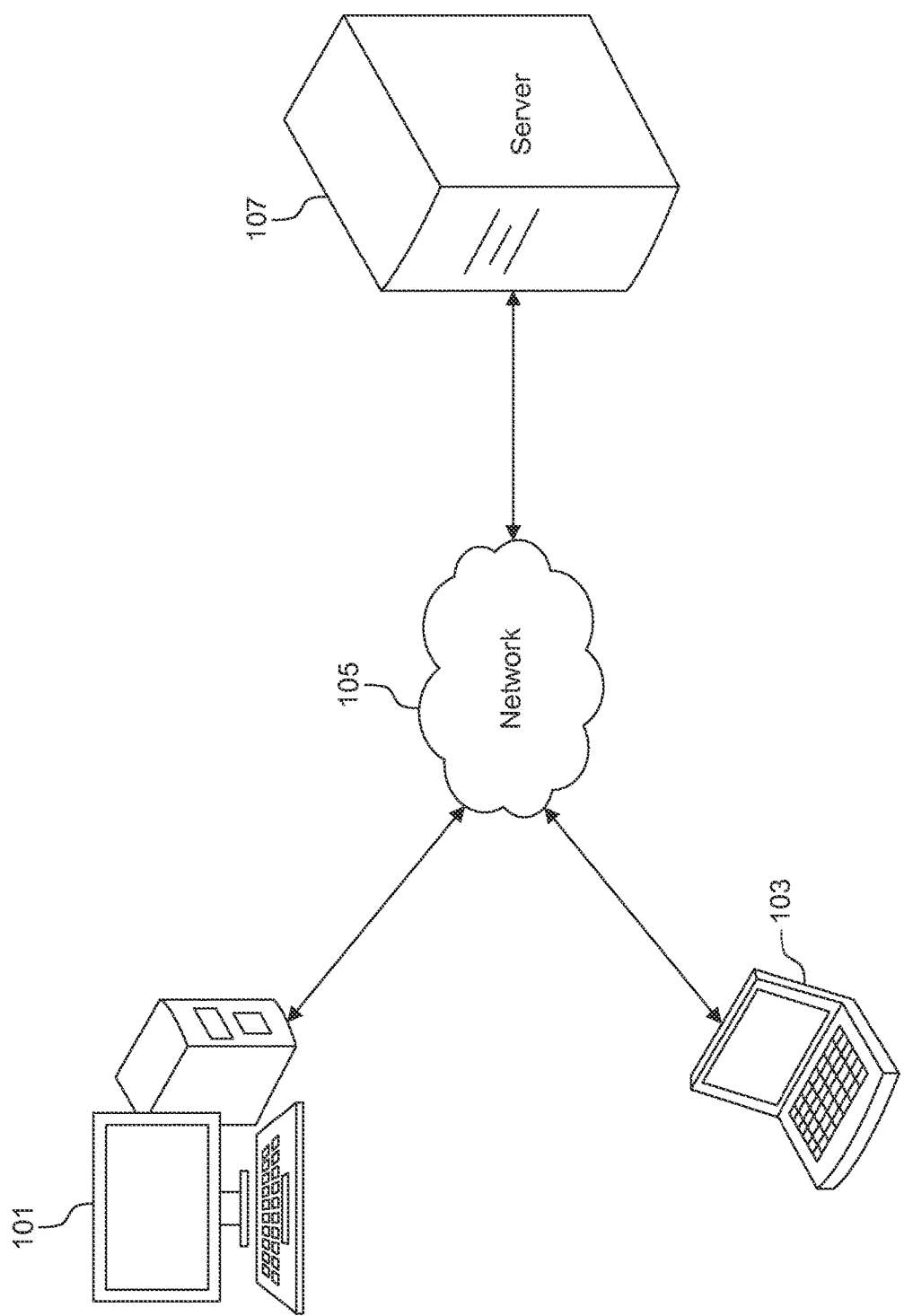
FIG. 1 is a diagram illustrating a system for creating tables using auto-generated templates, according to an exemplary embodiment.

FIG. 1 is a diagram illustrating a system 100 for creating tables using auto-generated templates, according to an exemplary embodiment. System 100 includes computing devices 101 and 103, which are connected to a server 107 via a network 105. The server 107 and the computing devices 101 and 103 may communicate over the network 105 using protocols such as Internet Protocol Suite (TCP/IP), HTTP, FTP, IMAP, Fibre Channel Protocol (FCP), Fibre Channel over Ethernet (FCoE), Internet SCSI (iSCSI), and the like.

In some example implementations, the computing devices 101 and 103 include laptops, desktop computers, smartphones, tablets, mobile devices, wearable devices, workstations, personal digital assistants, mainframes, and the like. The computing devices 101 and 103, and the server 107 each include software and hardware (e.g., at least one processor and at least one memory).

In some example implementations, the computing devices 101 and 103 are used to generate tables (e.g., tabular data) from report files such as text, PDF, XPS and HTML files.

Generating tabular data is performed, for example, using a report mining tool, application, or the like stored and/or executing on the computing devices 101 and/or 103. Generating tabular data (e.g., tables) from report files is explained in more detail below with reference to FIGS. 2-6. Generally, tabular data refers to data that is arranged in rows and columns, for example, in tables.

In some example implementations, the server 107 is a platform that provides the functionality of the report mining tool, application or the like to the computing devices 101 and 103, for example, via the network 105. This functionality can be provided, for example, as part of a software-as-a-service (SaaS), platform-as-a-service (PaaS) or infrastructure-as-a-service (IaaS) offering or architecture. That is, the computing devices 101 and 103 may generate or transmit report files to the server 107 for mining and creating tabular data. In other example implementations, the report files may be generated at the server 107 by the computing devices 101 and/or 103 via the network 105, for example, using an application (e.g., web browser application) executing on or accessible by the computing devices 101 and/or 103 and, in turn, mined to create tables (e.g., tabular data).

Figure 2:
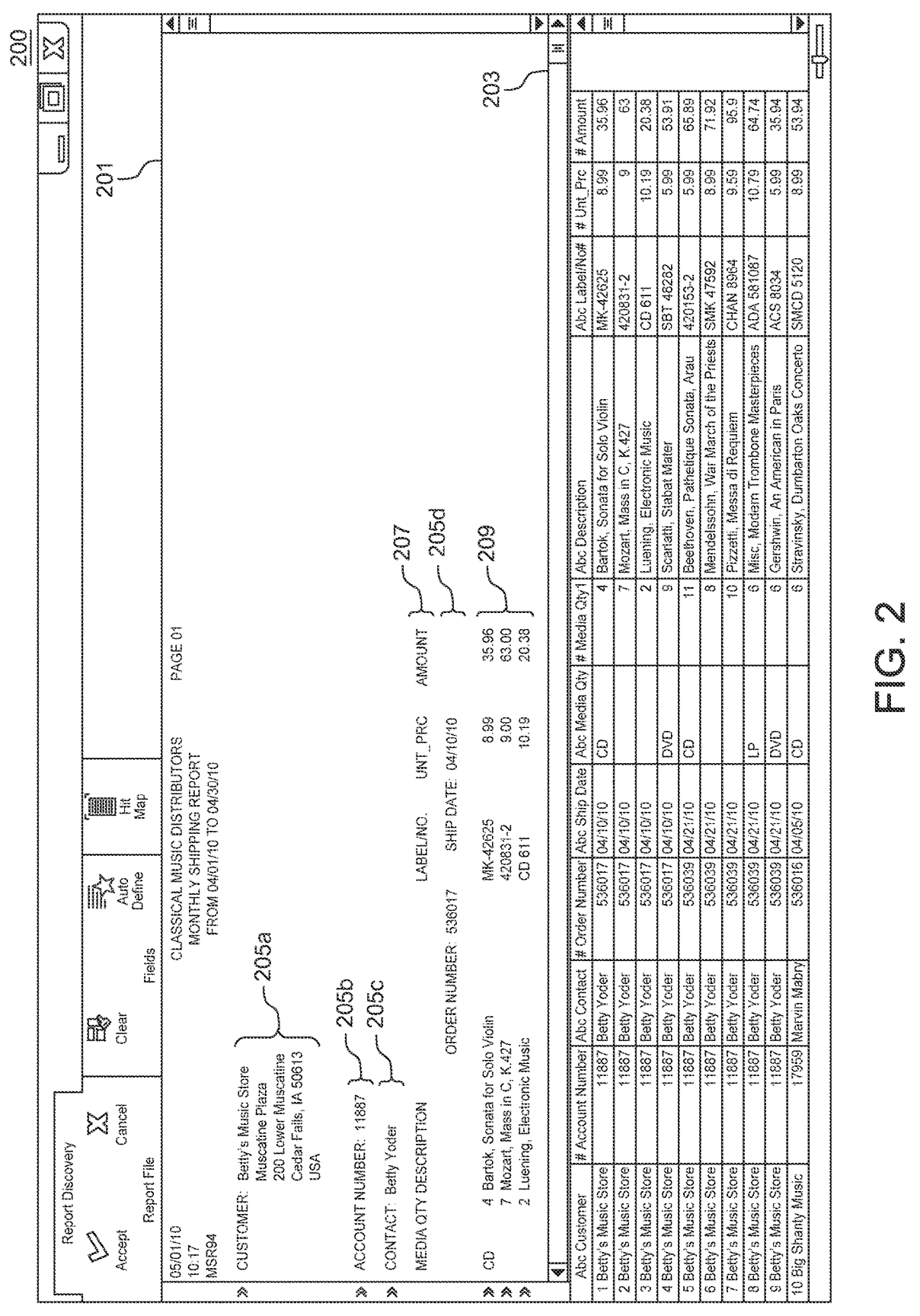

FIG. 2 illustrates a graphical user interface 200 for generating tables, according to an exemplary embodiment. The graphical user interface 200 may be generated, rendered, displayed and/or caused to be displayed by an application program or the like stored on and/or running on a computing device (e.g., FIG. 1, computing devices 101 and 103) or server (e.g., FIG. 1, server 107).

As shown in FIG. 2, graphical user interface 200 includes two panels, sections, widgets, or the like (201 and 203). In some example implementations, the panel 201 includes and/or displays data corresponding to a report file (e.g., text file), and the panel 203 includes and/or displays the data from the report file in tabular form (e.g., table of rows and columns). That is, as explained in further detail below with reference to FIGS. 3-6, the data presented in the panel 201 is report data of or in a report file. In turn, the data is mined, converted to tabular data, and displayed in corresponding rows and columns in the panel 203.

More specifically, the panel 201 includes and/or displays data from a report file, such as a text file. In some example implementations, the report file is made up of several types of data including one or more of labeled data, row labels, and row data. Labeled data refers to label and value pairs in a report. In some example implementations, a label is a text value that is immediately followed by a colon (‘:’) character, or the like (e.g., hyphen, arrow). In some example implementations, the value in a label/value pair of labeled data is the information, text or data that follows the colon character.

As shown in FIG. 2, the graphical user interface 200 includes labeled data (or sets of labeled data) 205a, 205b, 205c, and 205d (collectively "205). For example, the labeled data 205a reads:

CUSTOMER: Betty's Music Store
Muscatine Plaza
200 Lower Muscatine
Cedar Falls, Iowa 50613
USA The labeled data 205a thus includes a label "CUSTOMER" that is identified as a label by the colon character immediately following it. The "CUSTOMER" label is associated or paired with the value comprising the text following the colon character, specifically the name and address of the customer, Betty's Music Store.

In another example, the labeled data 205b reads:
ACCOUNT NUMBER: 11887

That labeled data 205b thus includes a label "ACCOUNT NUMBER" that is identified as such by the colon character immediately following it. The value of the labeled data corresponding to the label "ACCOUNT NUMBER" is the text "11887," which is identified as a value by the fact that it follows the colon character.

Row labels refer to identical lines that represent a tabular region's column header. In some example implementations, row labels may be arranged on the top or bottom of columns, or the left or right of rows, for example, in the event that tabular data is organized horizontally. For example as shown in FIG. 2, the graphical user interface 200 includes and/or displays row labels 207, which read:

MEDIAQTY DESCRIPTION LABEL/NO. UNT_PRC AMOUNT

The row labels represent the column headers of the row data (e.g., row data 209).

Row data refers to data values obtained from a report. The row data is associated with row labels, which act as headers for the row data. As shown in FIG. 2, the graphical user interface 200 includes row data 209, which reads, in part:

| CD | 4 | Bartok, Sonata for Solo Violin | MK-42625 | 8.99 | 35.96 |
|----|---|-------------------------------|----------|------|-------|
|    | 7 | Mozart, Mass in C, K.427      | 420831-2 | 9.00 | 63.00 |
|    | 2 | Luening, Electronic Music     | CD 611   | 10.19| 20.38 |

In turn, the labeled data 205, row labels 207, and row data 209 is parsed and used to create a table or the like, which is displayed in panel 203. That is, the panel 203 includes and/or displays the information from the report file displayed in panel 201, in tabular form (e.g., table). Grouping and classifying data or lines of data to generate tabular data (e.g., tables) from a report is described in more detail below with reference to FIGS. 3-6.

Figure 3:
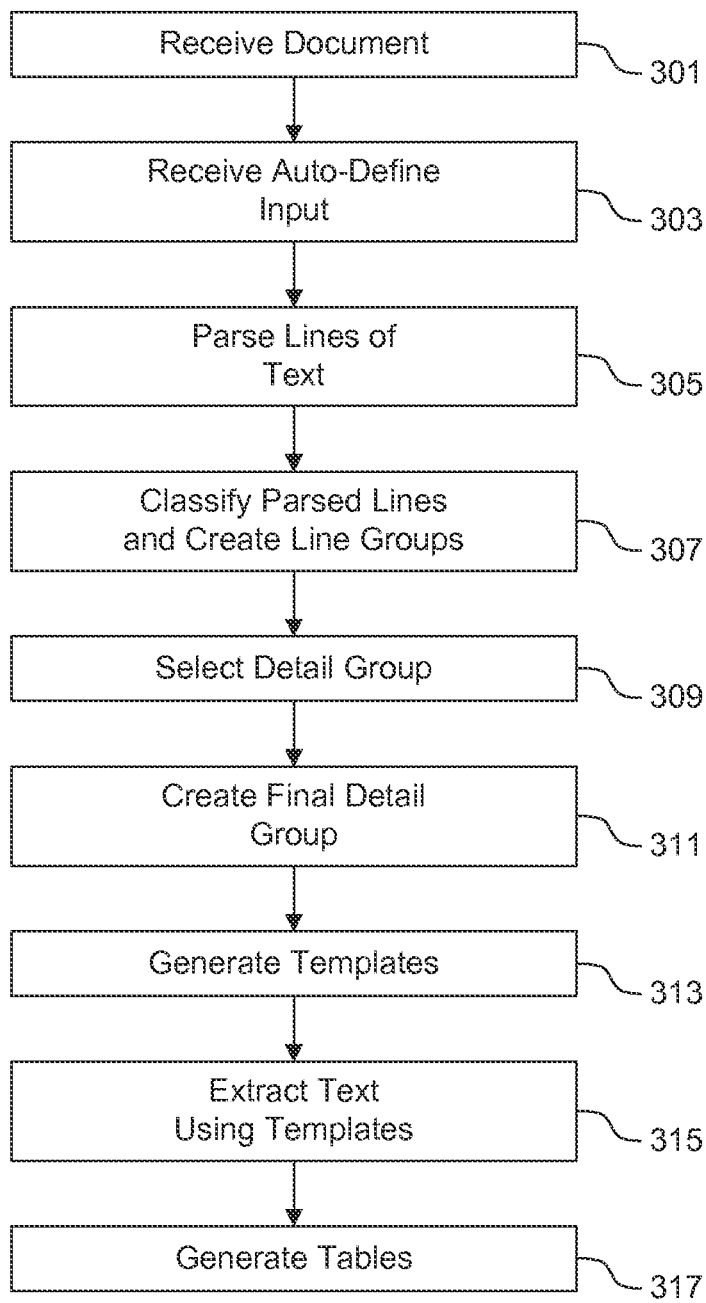
FIG. 3 illustrates a flow chart for generating tables from a report, according to an exemplary embodiment.

FIG. 3 illustrates a flow chart 300 for generating tables from a report, according to an exemplary embodiment. Although in FIG. 3 the storage and retrieval of the report and subsequent generation of corresponding tables is performed locally on a computing device (e.g., computing device 101), it should be understood that some or all of those functions may be performed with or by another system or device such as server 107.

At step 301, the computing device receives a report file. The report file may be received from a memory of or associated with the computing device. In some example implementations, the report file is received in response to a retrieval request from the computing device. In some example implementations, the report file is selected via a menu option (e.g., open) in a graphical user interface (e.g., FIG. 2, interface 200), or by dragging and dropping the report file into the panel or widget 201 of interface 200. As discussed in more detail above with reference to FIG. 2, a report file includes a report and/or report data in various formats including text (e.g., plain text), rich text, PDF, XML, ASCII, and the like.

In turn, at step 303, the computing device receives an input including instructions to generate template trapping rules and produce one or more tables based on the report file received at step 301. In some example implementations, the input is referred to as an auto-define input (FIG. 2, "Auto Define"). The auto-define input is received, for example, in response to the clicking or selection of a button, icon, or the like by a user via a user interface (e.g., user interface 200). In some example implementations, the template generation and/or creation of one or more tables is performed automatically when a report file is selected, without requiring user input or selection of an auto-define button and/or icon.

At step 305 a looping process is performed to parse each line of text in the report file into a collection of text fragments. More specifically, at step 305, a line of text in the report file is selected to be parsed. In some example implementations, the first line of the report file is initially selected to be parsed. The selected line of text is parsed into a collection of text fragments. Text fragments in a line of text may be identified and/or separated by predetermined fragment separators such as a tab (e.g., horizontal tab character). In some example implementations, text fragments may be separated by other types of fragments separators (e.g., space, dashes, multiple tabs, multiple spaces (e.g., blanks)) based on the report creator's desired format. Text fragments may be values to be extracted, labels to be associated with values, or of undetermined type, which are described in more detail above with reference to FIG. 2, and below with reference to FIGS. 4-6.

More specifically, to identify text fragments in the selected line, the computing device sequentially searches each character in the line of text, starting, in some instances, with the first character (e.g., leftmost character, in English, Spanish, and other left-to-right languages); rightmost character in Arabic, Persian, Hebrew, and other right-to-left languages). Once a fragment separator is located or identified, the preceding characters up to the start of the line or up to the preceding fragment (e.g., fragment separator) are identified and/or separated as a fragment. The process is continued through the end of the line of text until all of the characters in the line of text have been separated into or assigned to corresponding text fragments.

In one example implementation, at step 305, the following line of text is selected to be parsed:

John Smith 123 Maple Street Lexington, N.C.

The computing device searches from left to right until it locates fragment separators such as tab characters, which are found immediately following the words "Smith", "Street" and "NC". Accordingly, the text preceding each tab character is separated as a text fragment and added to the collection of text fragments of the selected line of text, for example, as show in Table 1:

TABLE 1

| Fragment Number | Text Fragment |
|-----------------|---------------|
| 1 | John Smith |
| 2 | 123 Maple Street |
| 3 | Lexington, NC |

In some example implementations, the text fragments are associated with properties including location, length, data type, and alignment. The location of a text fragment refers to the character offset of the text fragment (e.g., the start of the text fragment) relative to the start of the line. For example, a text fragment starting at the fifth character of a line has a character offset equal to five (or 4, in cases where the first character offset is 0). The length property of a text fragment refers to the number of characters in the text fragment. The data type property of a text fragment may be a text, number, date, or the like. The alignment property of a text fragment refers to how the characters of the text fragment are aligned (e.g., left, right, undetermined) within the fragment.

In some example implementations, at step 305, the properties of the text fragments of the selected line are determined and/or stored in association with their respective text fragments. For instance, in the above example line of text discussed with reference to step 305, the following information shown in Table 2, including properties, are collected and/or stored:

TABLE 2

| Fragment Number | Text Fragment | Location | Length | Data Type | Alignment |
|---|---|---|---|---|---|
| 1 | John Smith | 0 | 10 | Text | Left |
| 2 | 123 Maple Street | 18 | 16 | Text | Left |
| 3 | Lexington, NC | 38 | 13 | Text | Left |

In turn, at step 305, the next line of text in the report file is selected and parsed into text fragments. The parsing process is repeated until all lines of text in the report file (or a predetermined number of lines of text (e.g., a portion of the report file)) have been parsed into text fragments.

At step 307, the parsed lines of text are classified and grouped based on their classifications. More specifically, the parsed lines of text are classified, for example, as labeled data, row labels, and row data. In some example implementations, multiple sets of labeled data groups, row label groups and row data groups are created and/or stored, to store associated lines of text based on shared properties. These classifications are described in more detail above with reference to FIG. 2. Once the parsed lines of text have been classified, they are grouped and/or associated with each other. That is, for example, lines of text that are classified as labeled data lines of text are grouped together. Generally, classifying and grouping lines of text is performed based on the sharing (e.g., overlapping, matching) of properties (e.g., alignment, data type, length, location) of text fragments among lines of text. The process for classifying and grouping lines of text is described in further detail below with reference to FIG. 4.

In turn, at step 309, the groups of lines of text created, determined, and/or selected at step 307 are examined and/or analyzed to select a detail group. In some example implementations, the detail group is the group, among the groups of lines of text determined at step 307, that has or includes the largest number of lines of text. In some example implementations, the detail group is alternatively and/or additionally determined based on its position relative to other groups of lines of text. For example, the detail group may be determined to be the lowermost group of lines—that is, the group with the lowest position on a page made up of lines of text. More specifically, a "first hit" line refers to the first line in a group that causes a group of lines to be classified. To determine the detail group, the first hit line of each of the detail groups are examined, and the group having a first hit line furthest from the start of the report is deemed to be the detail group. In some example implementations, if two groups include the same number of lines of text, the group positioned closest to the top of the page is selected as the detail group.

At step 311, a final detail group is determined and/or selected. In some example implementations, to create a final detail group, groups outside of the detail group of step 309 (e.g., groups not selected to be in the detail group) are examined or reexamined to identify groups of lines of text that have similar properties to the detail group, and thus have a strong relationship to the detail group. Those groups with similar properties may be referred to as "relevant groups." The relevant groups are merged with the detail group of step 309 to create the final detail group. Creating the final detail group is described in further detail below with reference to FIG. 5.

Although not illustrated in FIG. 3, all or a portion of the groups of lines of text that are not selected as part of the final detail group are referred to as "append groups." Append groups, in some example implementations, refer to groups of lines of text that contribute to an output record (e.g., table), but do not cause the record to be written. That is, append lines may be hierarchical parents to the next detail line encountered in a report and/or to other append lines that occur between it and the next detail line.

In turn, at step 313, templates are generated for the final detail group and append groups. A template generally refers to one or more extraction directives and trap masks, which are used to read report files, extract data from the reports, and generate corresponding tables of values. The extraction directives of a template indicate the character offset (e.g., character index) and the number of characters of text to extract (e.g., field length) from a line of text. In other words, the extraction directives indicate where fields occur on a line of text (e.g., relative to the starting position in a line (e.g., first character in a line of text)). The trap mask, on the other hand, indicates what character types or fields are expected on each line of text in the report. More specifically, a trap mask may specify and/or code that a character located at the fifth character position of a line must be an uppercase 'A' and the character at the $20^{th}$ character position must be a digit. The trap mask is then used to "trap" lines of text meeting that criteria. In turn, those lines that are trapped (e.g., that match the criteria of the trap mask) are considered "hits" and therefore subject to the extraction directives in accordance with specified character offsets and lengths. Templates and the generation of templates are described in further detail below with reference to FIG. 6.

Once the templates have been generated, text is extracted, at step 315, from the report file by applying the templates. Moreover, at step 317, the extracted text is used to generate tables. In particular, the templates are applied to identify fragments located in fields of lines of text using the trap mask and extraction directives. When fragments (e.g., label, value) are identified, they are extracted and written (e.g., copied, appended, etc.) to tables in their respective row and column positions. Extracting data using templates and generating tables based on that data is described in further detail below with reference to FIG. 6. It should be understood that generation of the templates occurs without user input (e.g., other than initial triggering of process). That is, the templates are automatically generated in that they do not require users to input, specify and/or indicate, for example, character offsets, field locations, data types, and the like. More specifically, extracted text fragments may be arranged in any way desired. In some example implementations, label data may be arranged at the top of a document, followed by row label and row data pairs. In some example implementations, row label and row data pairs may be identified by their positive relative to one another in the original report file. For example, in some implementations, a row label line is the first row label line located above its corresponding row data.

Figure 4:
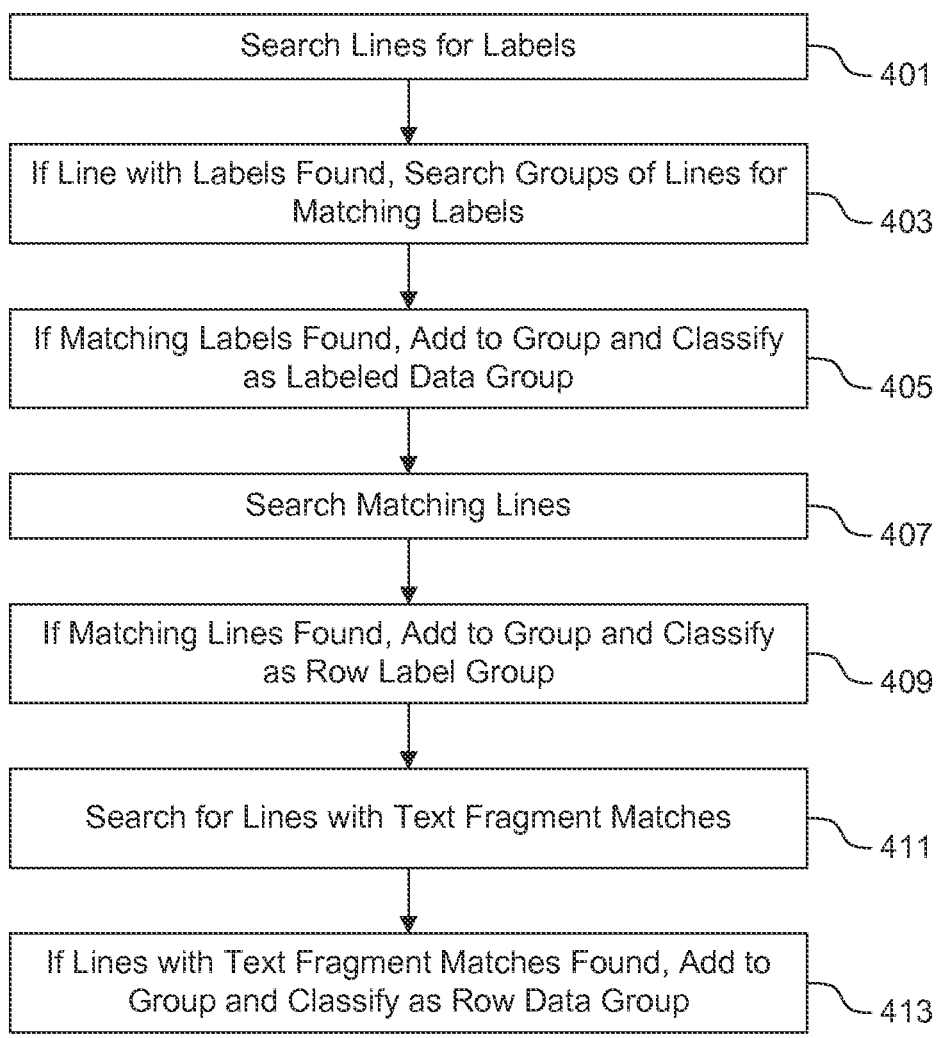
FIG. 4 is a flow chart of a process for classifying and grouping lines of text, according to an exemplary embodiment.

FIG. 4 is a flow chart of a process 400 for classifying and grouping lines of text, according to an exemplary embodiment. In some example implementations, empty groups are created in which to add lines of text according to their classifications. Generally, classifying and grouping lines of text is performed by examining the text fragments of each line (e.g., parsed in FIG. 3, step 303).

More specifically, at step 401, the lines of text in the report are examined to identify labels. As described above in further detail with reference to FIG. 2, in some example implementations, a label is a text fragment or value that is immediately followed by a colon character. In particular, to identify a label, the text fragments of each line in the report file are analyzed and, if a label is identified, the groups of lines of the report file are examined at step 403 to determine if a matching label has already been added to one of the groups. A matching label is a label that has the same value as that of the text fragment containing the label identified at step 401.

In turn, if a matching label is found at step 403, the label identified at step 401 is added to the group containing the matching label (e.g., a first group), at step 405. The group (e.g., first group) to which the label is added (e.g., the group containing the matching label) is classified as a labeled data group. In some example implementations, if a matching label is not identified, the group containing the label identified at step 401 is deleted and/or ignored for purposes of generating a corresponding table.

At step 407, the lines of text are searched to identify exact matching lines. In some example implementations, exact matching lines of step 407 refers to two or more lines that have the same number of text fragments and same values. More specifically, in some example implementations, lines of text in a row label group have identical lines. Identical lines may refer to two or more lines of text that have the same text values at each character offset (e.g., position, index). If two or more lines are found that are an exact match, they are added to a second group of lines at step 409. The second group of lines may be classified as a row label group, indicating that the lines identified at step 407 are row labels.

In some example implementations, lines being added to a group (e.g., the second group) are analyzed to determine if they are separator lines. In some example implementations, separator lines are lines of text in a report file that are not row labels, labeled data or row data, and are instead completely or substantially made up of character separators (e.g., equal signs, hyphens, dashes, asterisks, or the like, or combinations thereof). If a line is identified as a separator line, in some example implementations, it is not added to the second group of lines (e.g., at step 407).

At step 411, the lines of text in the report file are searched to identify two or more lines with fragment matches. In some example implementations, lines of text are deemed to have fragment matches if they have the same number of text fragments, and the corresponding text fragments on each line have matching properties. In some example implementations, matching properties required for text fragments to be considered to be matching include one or both of (1) alignment, and/or (2) data type. That is, corresponding fragments in lines of text (e.g., first fragment in first line, first fragment in second line) are aligned in the same manner (e.g., left, right, undetermined), and/or are of the same data type (e.g., text, number, date).

If it is determined, at step 411, that two or more lines of text in the report file have matching fragments (e.g., all or a substantial portion), those lines are added to a third group of lines, at step 413. The third group of lines may be classified as a row data group, indicating that the lines identified at step 411 are row data. In some example implementations, additional groups, including other row data groups may be generated.

Figure 5:
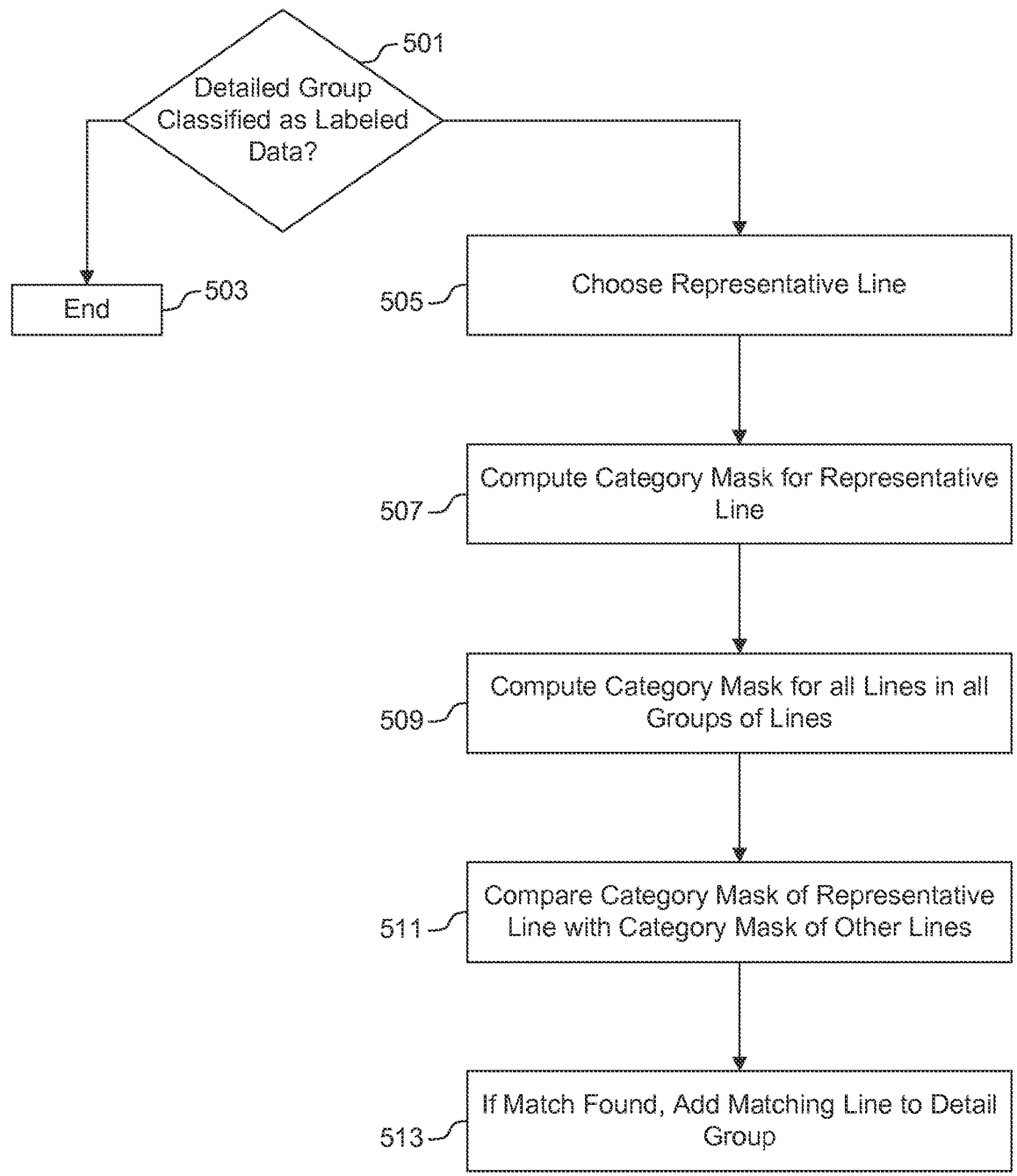
FIG. 5 is a flow chart of a process for creating a final detail group, according to an exemplary embodiment.

FIG. 5 is a flow chart of a process 500 for creating a final detail group, according to an exemplary embodiment. At step 501, the previously selected and/or generated detail group (e.g., at step 309 in FIG. 3) is analyzed to determine whether it has been classified as a labeled data group (e.g., a group of lines of text consisting of label/value pairs). If it is determined that the detail group is a labeled data group, the process ends at step 503, and the detail group is selected as the final detail group without merging with other groups or lines of text. Creating a final detail group allows for more inclusive trap masks to be generated.

On the other hand, if at step 501 it is determined that the detail group is not classified as a labeled data group, a representative line is chosen and/or selected at step 505. In some example implementations, the representative line is the first line among the lines of text in the group (e.g., the detail group).

In turn, a category mask is computed and/or generated for the representative line, at step 507. A category mask is a character mask or the like that associates a character type with each character offset on a line of text. In some example implementations, character types may be alphabetic characters (e.g., A, b, z), numeric characters (e.g., 0, 1, 2), punctuation characters (e.g., comma, quote, dash), and/or blank characters (e.g., a space character). The character types may be identified on a category mask using corresponding codes and/or variables. In one example implementation, an alphabetic character is identified and/or indicated on a category mask as a 'A', a numeric character as an 'N', a punctuation character as a 'P' and a blank character as a 'B'. More specifically, to generate a category mask for a line of text, each character (e.g., from left to right) on the line is analyzed and a corresponding code or variable (e.g., A, N, P, B) is assigned to that character offset on the line of text.

For example, at step 507, a category mask is generated for a line of text (e.g., representative line) as follows:

| Line of text: | My zip code = 27127 |
|---|---|
| Category mask: | AABAAABAAAABPANNNNN |

Once the category mask has been generated for the representative line of the detail group, a category mask is in turn generated at step 509 for all or a portion of the lines in the other groups of lines of text in the report file. Generating a category mask for the other lines of text is performed as described above with reference to the generating of the category mask for the representative line in step 507.

At step 511, the category mask of each line of text generated at step 509 is compared to the category mask of the representative line of the detail group generated at step 511. In turn, at step 513, if a match is identified (e.g., the category mask of the representative line matches the category mask of a line of text among the other lines of text), the line of text matching the representative line is added to the detail group. The process is repeated for every one of the other lines, until all of the other lines of text have been analyzed, and those having a category mask matching the representative line have been merged with and/or added to the detail group. The resulting collection of lines (e.g., detail group plus the lines of the text, among the other lines of text, that have a category mask matching the representative line) is referred to as the "final detail group." In some example implementations, matching category masks refers to two or more category masks that have identical (or substantially identical) character types at each character offset. That is, for two category masks to match, the category of a first mask corresponding to a first line must match (e.g., be equal to)

the category of the second mask corresponding to a second line, at each character position (e.g., offset, index). As detailed above, the category at each character position refers to the type of character (e.g., alphabetic, numeric, punctuation, blank) at a given character position.

Figure 6:
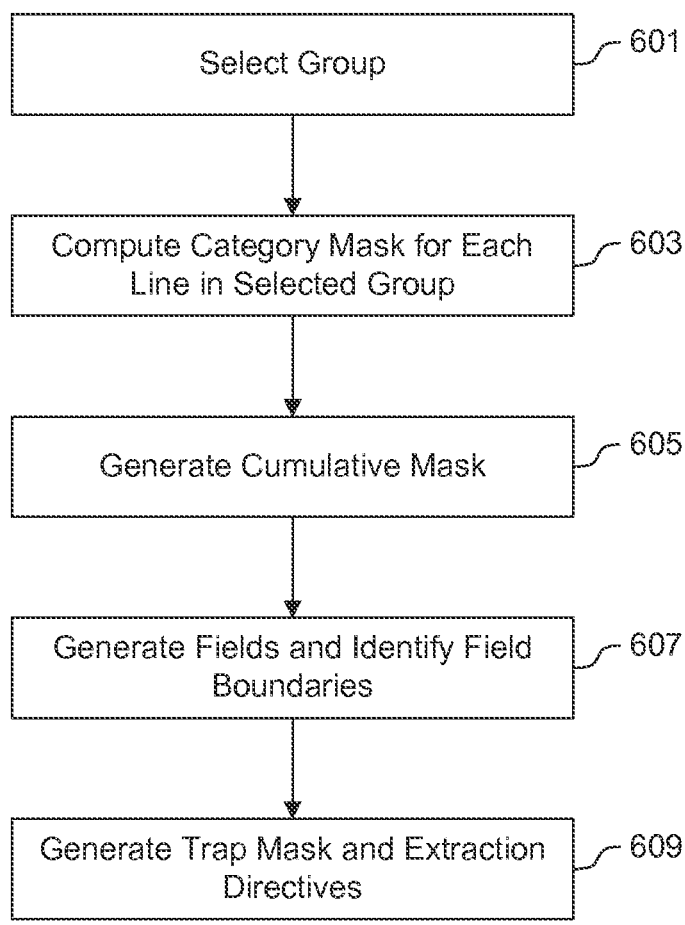
FIG. 6 is a flow chart of a process for creating templates, according to an exemplary embodiment.

FIG. 6 is a flow chart of a process 600 for creating templates, according to an exemplary embodiment. In some example implementations, corresponding templates are generated for the final detail group and for the append groups. As described above in more detail with reference to FIG. 3, templates refer to extraction derivatives and trap masks that are used to generate tables by extracting data from a text based report.

At step 601, a group for which a template is to be generated is selected. In turn, at step 603, category masks are computed and/or generated for each of the lines of text in the selected group. Generating category masks is described above in more detail with reference to FIG. 5 (e.g., steps 507, 509). A category mask that is calculated for an entire line of text is referred to as a "line mask."

At step 605, a cumulative mask is computed and/or generated. In some example implementations, generating the cumulative mask includes creating the cumulative mask and/or merging line masks with an existing cumulative mask. Generating a cumulative mask is performed two lines at a time by comparing the character mask of each character offset in one line to the character mask of the corresponding character offset in the other line, and assigning an updated variable and/or code to the corresponding character offset in the cumulative mask based on a set of category mask comparison rules (e.g., Table 3) in which 'A' represents an alphabetic character, 'N' represents a numeric character, 'P' represents a punctuation character, 'B' represents a blank character, 'X' represents a non-blank character, and T represents a character to be ignored. In some example implementations, the line masks of the first two lines of text in the selected group are used to initiate the cumulative mask (e.g., create an initial cumulative mask). The next line (e.g., third line) is then processed using the comparison rules, and the cumulative mask is updated accordingly.

Examples of comparison rules for generating the cumulative mask are shown in Table 3:

TABLE 3

| Rule |
| --- |
| A + A = A |
| A + N = A |
| A + P = X |
| A + B = I |
| N + N = N |
| N + P = X |
| N + B = I |
| P + P = P |
| P + B = I |
| B + B = B |
| X + X = X |
| X + A = X |
| X + N = X |
| X + P = X |
| X + B = I |
| I + A = I |
| I + N = I |
| I + P = I |
| I + X = I |
| I + I = I |
| I + [no character] = I |

In one example implementation, the comparison rules of Table 3 are applied as shown below to generate a cumulative mask for a group consisting of the following three lines of text:

| Line 1: | John Smith | 123 Maple Street | Lexington, NC |
| Line 2: | Mary Jones | 12 Main Street | Salisbury, NC |
| Line 3: | Steve Brown | 5566 Oak Street | Myrtle Beach, SC |

To generate the cumulative mask (e.g., result) for a group consisting of the three lines above, the comparison rules are applied to the line masks for line 1 (mask 1) and line 2 (mask 2) above (e.g., generated at step 603), as follows:

```
Mask 1:
AAAABAAAAABBBBBBBBNNNBAAAAABAAAAAABBBBBAAAAAAAAAPB
AA

Mask 2:
AAAABAAAAABBBBBBBBNNNBAAAAABAAAAAABBBBBAAAAAAAAAPB
AA

Result 1:
AAAABAAAAABBBBBBBBNNIIAAAIAIAAAAIIBBBBBAAAAAAAAAPB
AA
```

In turn, the line mask of line 3 is read and the comparison rules of Table 3 are applied to the cumulative mask (e.g., result 1 (of mask 1 and mask 2)) and the line mask of line 3 (e.g., generated at step 603), as follows:

```
Result 1:
AAAABAAAAABBBBBBBBNNIIAAAIAIAAAAIIBBBBBAAAAAAAAAPB
AA

Mask 3:
AAAAABAAAAABBBBBBBBNNNNBAAABAAAAAABBBBBAAAAAABAAAA
APBAA

Result 2:
AAAAIIAAAAIBBBBBBBBNNIIIAAIIIAAAAIIBBBBAAAAAAIAAXI
AXIII
```

Result 2 represents the cumulative mask for the group consisting of lines 1, 2 and 3 above. The cumulative mask (e.g., result 2) represents the average mask for the entire group. In turn, at step 607, fields are generated and field boundaries are identified using the cumulative mask calculated at step 605. In one example implementation, generating fields includes analyzing the cumulative mask and determining where fields are located based on the character masks in the cumulative mask. More specifically, each character mask in the cumulative mask is analyzed to determine where fields begin and end. This may be done, for example, by identifying field boundaries, which, in some example implementations, result in corresponding columns being created on a table.

In some example implementations, a field boundary is a left-most or right-most non-space character of a text fragment. A field boundary that aligns (e.g., left or right) with other text fragments is considered to have an alignment bias, which is taken into account when generating a trap mask for the line. For example, if the right most-character of a text fragment is a digit, and this fragment is right aligned with other text fragments whose right most character is a digit at the $20^{th}$ character position (e.g., offset), a trap mask of "numeric" at the $20^{th}$ position and "blank" at the $21^{st}$ position of a line reliably traps all lines with text fragments whose right-most character is a digit at the $20^{th}$ position.

When determining a field position and length used to extract a field value, text fragments with identical alignments are selected as field candidates, and then reexamined for the left-most left boundary and right-most right boundary, thereby producing and/or identifying a starting character position and length for the field At step 609, a trap mask and extraction directives are generated based on the cumulative mask and the field boundaries identified at step 607. For example, assuming the cumulative mask calculated above (e.g., result 2) is used to generate a trap mask and extraction directives, the identified boundaries are first analyzed. Based on those boundaries, the trap mask identifies that three fields exist in the lines of text of the group above (e.g., lines 1-3). In other words, in some example implementations, a trap mask may merely consist of where field boundaries (e.g., blank spaces) begin and/or are located, which in turn can be used to locate fields. Still with reference to the example above, the trap mask identifies three fields by locating the field boundaries. In turn, the trap mask can be applied to the group and/or report to identify line masks of the lines in the group and/or report that match the trap mask (e.g., that have similar character or line masks). If the lines match (e.g., they have similar character or line masks) they are turned over for processing using the extraction directives.

The extraction directives identify where on the line (e.g., relative to the start of the line) each of the fields identified in the trap mask are located and their length, in order to be extracted and/or copied into a table. That is, extraction directives may indicate, for example, which character to go to, and how many characters to extract for a given field. In one example implementation, extraction directives for the cumulative mask described above may result in the following directives to be applied to a single line: go to character offset 1, and extract 11 characters; go to character offset 19 and extract 16 characters; and go to character offset 39 and extract 16 characters. The extracted sets of characters can be inserted into corresponding columns in a table.

The trap mask and extraction directives therefore make up a template to be used to extract data from fields and insert it into distinct columns of a table. As described above, templates are generated for and applied to each group of lines (e.g., final detail group, append groups). In this way, different type of data is extracted and inserted into tables according to how the data is structured in the original report.

Figure 7:
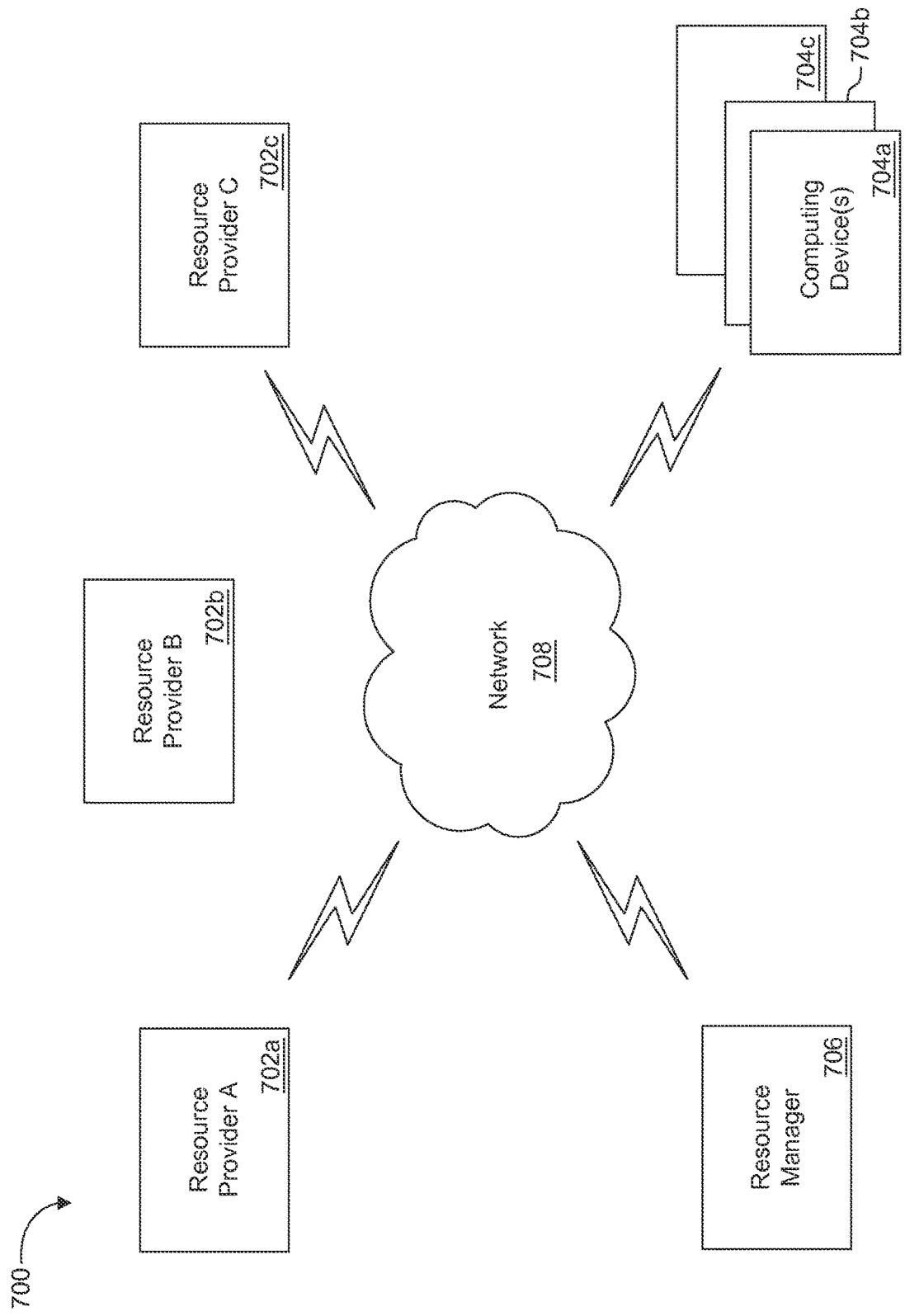
FIG. 7 shows an illustrative network environment for use in the methods and systems for automatically creating tables using auto-generated templates

FIG. 7 shows an illustrative network environment 700 for use in the methods and systems for automatically creating tables using auto-generated templates, as described herein. In brief overview, referring now to FIG. 7, a block diagram of an exemplary cloud computing environment 700 is shown and described. The cloud computing environment 700 may include one or more resource providers 702a, 702b, 702c (collectively, 702). Each resource provider 702 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 702 may be connected to any other resource provider 702 in the cloud computing environment 700. In some implementations, the resource providers 702 may be connected over a computer network 708. Each resource provider 702 may be connected to one or more computing device 704a, 704b, 704c (collectively, 704), over the computer network 708.

The cloud computing environment 700 may include a resource manager 706. The resource manager 706 may be connected to the resource providers 702 and the computing devices 704 over the computer network 708. In some implementations, the resource manager 706 may facilitate the provision of computing resources by one or more resource providers 702 to one or more computing devices 704. The resource manager 706 may receive a request for a computing resource from a particular computing device 704. The resource manager 706 may identify one or more resource providers 702 capable of providing the computing resource requested by the computing device 704. The resource manager 706 may select a resource provider 702 to provide the computing resource. The resource manager 706 may facilitate a connection between the resource provider 702 and a particular computing device 704. In some implementations, the resource manager 706 may establish a connection between a particular resource provider 702 and a particular computing device 704. In some implementations, the resource manager 706 may redirect a particular computing device 704 to a particular resource provider 702 with the requested computing resource.

Figure 8:
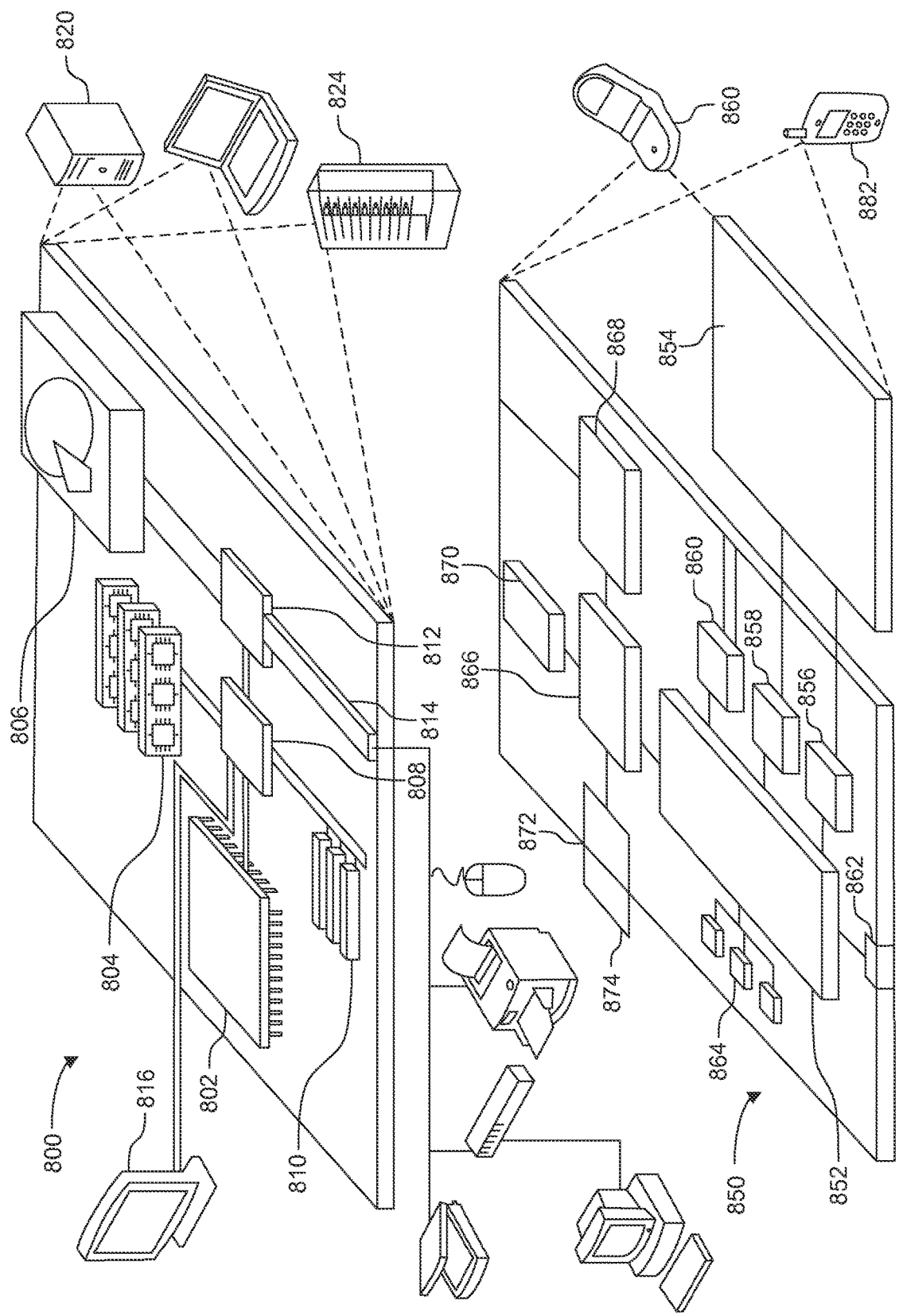
FIG. 8 shows an example of a computing device and a mobile computing device 850 that can be used in the methods and systems described in this disclosure.

FIG. 8 shows an example of a computing device 800 and a mobile computing device 850 that can be used in the methods and systems described in this disclosure. The computing device 800 is intended to represent various forms of digital computers, such as laptops, desktops, workstations, personal digital assistants, servers, blade servers, mainframes, and other appropriate computers. The mobile computing device 850 is intended to represent various forms of mobile devices, such as personal digital assistants, cellular telephones, smartphones, and other similar computing devices. The components shown here, their connections and relationships, and their functions, are meant to be examples only, and are not meant to be limiting.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 may also be another form of computer-readable medium, such as a magnetic or optical disk.

The storage device 806 is capable of providing mass storage for the computing device 800. In some implementations, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 802), perform one or more methods, such as those described above. The instructions can also be stored by one or more storage devices such as computer- or machine-readable mediums (for example, the memory 804, the storage device 806, or memory on the processor 802).

The high-speed interface 808 manages bandwidth-intensive operations for the computing device 800, while the low-speed interface 812 manages lower bandwidth-intensive operations. Such allocation of functions is an example only. In some implementations, the high-speed interface 808 is coupled to the memory 804, the display 816 (e.g., through a graphics processor or accelerator), and to the high-speed expansion ports 810, which may accept various expansion cards (not shown). In the implementation, the low-speed interface 812 is coupled to the storage device 806 and the low-speed expansion port 814. The low-speed expansion port 814, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. In addition, it may be implemented in a personal computer such as a laptop computer 822. It may also be implemented as part of a rack server system 824. Alternatively, components from the computing device 800 may be combined with other components in a mobile device (not shown), such as a mobile computing device 850. Each of such devices may contain one or more of the computing device 800 and the mobile computing device 850, and an entire system may be made up of multiple computing devices communicating with each other.

The mobile computing device 850 includes a processor 852, a memory 864, an input/output device such as a display 854, a communication interface 866, and a transceiver 868, among other components. The mobile computing device 850 may also be provided with a storage device, such as a micro-drive or other device, to provide additional storage. Each of the processor 852, the memory 864, the display 854, the communication interface 866, and the transceiver 868, are interconnected using various buses, and several of the components may be mounted on a common motherboard or in other manners as appropriate.

The processor 852 can execute instructions within the mobile computing device 850, including instructions stored in the memory 864. The processor 852 may be implemented as a chipset of chips that include separate and multiple analog and digital processors. The processor 852 may provide, for example, for coordination of the other components of the mobile computing device 850, such as control of user interfaces, applications run by the mobile computing device 850, and wireless communication by the mobile computing device 850.

The processor 852 may communicate with a user through a control interface 858 and a display interface 856 coupled to the display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may provide communication with the processor 852, so as to enable near area communication of the mobile computing device 850 with other devices. The external interface 862 may provide, for example, for wired communication in some implementations, or for wireless communication in other implementations, and multiple interfaces may also be used.

The memory 864 stores information within the mobile computing device 850. The memory 864 can be implemented as one or more of a computer-readable medium or media, a volatile memory unit or units, or a non-volatile memory unit or units. An expansion memory 874 may also be provided and connected to the mobile computing device 850 through an expansion interface 872, which may include, for example, a SIMM (Single In Line Memory Module) card interface. The expansion memory 874 may provide extra storage space for the mobile computing device 850, or may also store applications or other information for the mobile computing device 850. Specifically, the expansion memory 874 may include instructions to carry out or supplement the processes described above, and may include secure information also. Thus, for example, the expansion memory 874 may be provided as a security module for the mobile computing device 850, and may be programmed with instructions that permit secure use of the mobile computing device 850. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier and, when executed by one or more processing devices (for example, processor 852), perform one or more methods, such as those described above. The instructions can also be stored by one or more storage devices, such as one or more computer- or machine-readable mediums (for example, the memory 864, the expansion memory 874, or memory on the processor 852). In some implementations, the instructions can be received in a propagated signal, for example, over the transceiver 868 or the external interface 862.

The mobile computing device 850 may communicate wirelessly through the communication interface 866, which may include digital signal processing circuitry where necessary. The communication interface 866 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 868 using a radio-frequency. In addition, short-range communication may occur, such as using a Bluetooth®, Wi-Fi™, or other such transceiver (not shown). In addition, a GPS (Global Positioning System) receiver module 870 may provide additional navigation- and location-related wireless data to the mobile computing device 850, which may be used as appropriate by applications running on the mobile computing device 850.

The mobile computing device 850 may also communicate audibly using an audio codec 860, which may receive spoken information from a user and convert it to usable digital information. The audio codec 860 may likewise generate audible sound for a user, such as through a speaker, e.g., in a handset of the mobile computing device 850. Such sound may include sound from voice telephone calls, may include recorded sound (e.g., voice messages, music files, etc.) and may also include sound generated by applications operating on the mobile computing device 850.

The mobile computing device 850 may be implemented in a number of different forms, as shown in the figure. For example, it may be implemented as a cellular telephone 880. It may also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

What is claimed is:

1. A method comprising:
receiving, by a computing system, a report comprising lines of text;
generating, by the computing system, one or more templates for processing the report, wherein at least one of the templates includes a trap mask corresponding to a group of the lines of text in the report, the trap mask including one or more indications of expected character properties at given character positions on a line of text, wherein the trap mask is generated by:
generating, by the computing system, a cumulative mask corresponding to the group of the lines of text by (1) comparing a character mask of each character offset in a first line to a character mask of a corresponding character offset in a second line, and (2) assigning an updated variable or code to the corresponding character offset based on a set of category mask comparison rules, wherein the set of category mask comparison rules includes rules for alphabetic, numeric, punctuation, blank space, non-blank, and ignored characters;
extracting, by the computing system, text from the report based on the one or more templates;
generating, by the computing system, one or more tables using the text extracted from the report, wherein generating the one or more tables includes assigning text from text fragments of the lines of text to corresponding lines and fields in the one or more tables; and
providing, by the computing system, an electronic document comprising the one or more tables.

2. The method of claim 1, further comprising generating the trap mask, wherein generating the trap mask comprises:
generating, by the computing system, a category mask for each character in each line in the group of the lines of text.

3. The method of claim 2, wherein generating the trap mask comprises:
generating, by the computing system, a line mask for each line in the group of the lines of text, based at least in part on the category mask.

4. The method of claim 3, wherein generating the trap mask comprises:
creating, by the computing system, table fields using field boundaries identified based at least in part on the cumulative mask.

5. The method of claim 4, wherein generating the trap mask comprises:
generating, by the computing system, the trap mask based on the identified field boundaries.

6. The method of claim 1,
wherein each of the one or more tables includes one or more rows and one or more columns, and wherein the generating the one or more tables includes arranging the text from the report into a row and column format in which:
(i) each row or column includes labeled data, row labels, or row data, and
(ii) each location on the table includes text fragments of the lines of text.

7. The method of claim 1, further comprising:
identifying, by the computing system, the group of the lines of text from among the lines of text of the report.

8. The method of claim 7, wherein identifying the group of the lines of text comprises:
parsing each of the lines of text of the report into text fragments;
matching a number of text fragments in the lines of text of the report;
matching data types and alignment properties of the text fragments in each of the lines of the text of the report; and
grouping lines of text among the lines of the text of the report that have matching patterns to obtain the group of the lines of text.

9. The method of claim 1, wherein the matching patterns comprise at least one of matching locations of respective lines of text, matching lengths of respective lines of text, matching data types of respective lines of text, or matching alignments of respective lines of text.

10. A system comprising:
one or more processors;
one or more non-transitory computer-readable media including one or more sequences of instructions which, when executed by the one or more processors, causes:
receiving a report comprising lines of text;
generating one or more templates for processing the report, wherein at least one of the templates includes a trap mask corresponding to a group of the lines of text in the report, the trap mask including one or more indications of expected character properties at given character positions on a line of text, wherein the trap mask is generated by:
generating, by the computing system, a cumulative mask corresponding to the group of the lines of text by (1) comparing a character mask of each character offset in a first line to a character mask of a corresponding character offset in a second line, and (2) assigning an updated variable or code to the corresponding character offset based on a set of category mask comparison rules, wherein the set of category mask comparison rules includes rules for alphabetic, numeric, punctuation, blank space, non-blank, and ignored characters;
extracting text from the report based on the one or more templates;
generating one or more tables using the text extracted from the report, wherein generating the one or more tables includes assigning text from text fragments of the lines of text to corresponding lines and fields in the one or more tables; and
providing an electronic document comprising the one or more tables.

11. The system of claim 10, wherein the one or more sequences of instructions, when executed by the one or more processors, further causes generating the trap mask, wherein generating the trap mask comprises:
generating a category mask for each character in each line in the group of the lines of text.

12. The system of claim 11, wherein generating the trap mask comprises:
generating a line mask for each line in the group of the lines of text, based at least in part on the category mask.

13. The system of claim 12, wherein generating the trap mask comprises:
creating table fields using field boundaries identified based at least in part on the cumulative mask.

14. The system of claim 13, wherein generating the trap mask comprises:
generating the trap mask based on the identified field boundaries.

15. The system of claim 10,
wherein each of the one or more tables includes one or more rows and one or more columns, and
wherein the generating the one or more tables includes arranging the text from the report into a row and column format in which:
(i) each row or column includes labeled data, row labels, or row data, and
(ii) each location on the table includes text fragments of the lines of text.

16. The system of claim 10, wherein the one or more sequences of instructions, when executed by the one or more processors, further causes:
identifying the group of the lines of text from among the lines of text of the report.

17. The system of claim 7, wherein identifying the group of the lines of text comprises:
parsing each of the lines of text of the report into text fragments;
matching a number of text fragments in the lines of text of the report;
matching data types and alignment properties of the text fragments in each of the lines of the text of the report; and
grouping lines of text among the lines of the text of the report that have matching patterns to obtain the group of the lines of text.

18. The system of claim 10, wherein the matching patterns comprise at least one of matching locations of respective lines of text, matching lengths of respective lines of text, matching data types of respective lines of text, or matching alignments of respective lines of text.

19. A non-transitory computer-readable medium including one or more sequences of instructions which, when executed by one or more processors, causes:
receiving a report comprising lines of text;
generating one or more templates for processing the report, wherein at least one of the templates includes a trap mask corresponding to a group of the lines of text in the report, the trap mask including one or more indications of expected character properties at given character positions on a line of text, wherein the trap mask is generated by:
generating, by the computing system, a cumulative mask corresponding to the group of the lines of text by (1) comparing a character mask of each character offset in a first line to a character mask of a corresponding character offset in a second line, and (2) assigning an updated variable or code to the corresponding character offset based on a set of category mask comparison rules, wherein the set of category mask comparison rules includes rules for alphabetic, numeric, punctuation, blank space, non-blank, and ignored characters;

extracting text from the report based on the one or more templates;

generating one or more tables using the text extracted from the report, wherein generating the one or more tables includes assigning text from text fragments of the lines of text to corresponding lines and fields in the one or more tables; and providing an electronic document comprising the one or more tables.

20. The non-transitory computer-readable medium of claim 19, wherein the one or more sequences of instructions, when executed by the one or more processors, further causes generating the trap mask, wherein generating the trap mask comprises:

generating a category mask for each character in each line in the group of the lines of text.

21. The non-transitory computer-readable medium of claim 20, wherein generating the trap mask comprises:

generating a line mask for each line in the group of the lines of text, based at least in part on the category mask.

22. The non-transitory computer-readable medium of claim 21, wherein generating the trap mask comprises:

creating table fields using field boundaries identified based at least in part on the cumulative mask.

23. The non-transitory computer-readable medium of claim 22, wherein generating the trap mask comprises:

generating the trap mask based on the identified field boundaries.

24. The non-transitory computer-readable medium of claim 19, wherein each of the one or more tables includes one or more rows and one or more columns, and wherein the generating the one or more tables includes arranging the text from the report into a row and column format in which:
(i) each row or column includes labeled data, row labels, or row data, and
(ii) each location on the table includes text fragments of the lines of text.

25. The non-transitory computer-readable medium of claim 19, wherein the one or more sequences of instructions, when executed by the one or more processors, further causes:

identifying the group of the lines of text from among the lines of text of the report.

26. The non-transitory computer-readable medium of claim 25, wherein identifying the group of the lines of text comprises:

parsing each of the lines of text of the report into text fragments;

matching a number of text fragments in the lines of text of the report;

matching data types and alignment properties of the text fragments in each of the lines of the text of the report; and grouping lines of text among the lines of the text of the report that have matching patterns to obtain the group of the lines of text.

27. The non-transitory computer-readable medium of claim 19, wherein the matching patterns comprise at least one of matching locations of respective lines of text, matching lengths of respective lines of text, matching data types of respective lines of text, or matching alignments of respective lines of text.

* * * * *

UNITED STATES PATENT AND TRADEMARK OFFICE
CERTIFICATE OF CORRECTION

PATENT NO. : 10,853,566 B2
APPLICATION NO. : 16/151025
DATED : December 1, 2020
INVENTOR(S) : Mark Stephen Kyre Page 1 of 1

It is certified that error appears in the above-identified patent and that said Letters Patent is hereby corrected as shown below:

In the Claims

Column 22, Line 19, in Claim 17:
After "The", delete "system", and insert -- method -- thereof.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*